United States Patent Office 3,392,017
Patented July 9, 1968

3,392,017
WELDING CONSUMABLE PRODUCTS
Joseph F. Quaas, Island Park, and Daniel Tanzman, Far Rockaway, N.Y., assignors to Eutectic Welding Alloys Corporation, New York, N.Y., a corporation of New York
No Drawing. Filed Apr. 15, 1965, Ser. No. 448,237
12 Claims. (Cl. 75—154)

ABSTRACT OF THE DISCLOSURE

A self fluxing zinc-free low melting copper base alloy with additions of up to 0.4% Si, 0.02 to 0.5% B, 0.1 to 1% P and 4 to 25% Sn which is capable of being deposited by a variety of welding processes. The alloy is ductile, machinable and has highly desirable flow and wetting action on a variety of base metals.

---

This invention relates generally to low melting welding alloys and more particularly to low melting copper base welding alloys.

Heretofore copper base welding alloys with low melting characteristics have contained up to 60% by weight of zinc. In welding the zinc contents result in noxious fuming and can also inherently result in a change of the chemical composition of the filler metal alloy. Heretofore no zinc-free copper base alloys were available for general deposition by welding on low melting base metals such as brass and bronze. In addition, the existing copper base filler metal alloys require supplementary flux for proper deposition.

It is the general object of the present invention to avoid and overcome the foregoing and other difficulties and objectives to prior art practices by providing a zinc-free low melting copper base welding alloy capable of deposition by a variety of welding processes such as by carbon arc, oxy-fuel, tungsten-inert gas, atomic-hydrogen welding, open arc-welding processes, etc., wherein the copper base alloy can be utilized in a multiplicity of physical embodiments, such as for example, cast rods, tubular rods, electrode rods, powders, etc.

Another object of the present invention is to provide a copper base welding alloy that can be deposited without need for use of supplementary flux.

Still another object of the present invention is to provide a low melting copper base welding alloy with good ductility.

Yet another object of the present invention is to provide a low melting copper base welding alloy with the following deposit characteristics:
(1) Excellent bond to the base metal.
(2) Good oxidation resistance.
(3) Color matched to bronze base metals.
(4) Capable of utility with numerous and various base metals.

A further object of the present invention is to provide a low melting copper base alloy which can be flame sprayed in powder form.

A still further object of the present invention is to provide a low melting copper base alloy which will wet the surface of refractory carbides.

The aforesaid objects of the present invention and other objects, which will become apparent as the description proceeds, are achieved by providing a low melting copper base alloy containing by weight 4% to 25% tin, 1% to 8% nickel, .1% to 1% phosphorus, up to 2% chromium and various specific amounts of iron, silicon, and boron.

It has been discovered that when copper-tin-phosphorus ternary alloys are modified by alloying with up to .4% silicon and up to .5% boron the resultant alloys in welding are characterized by surprising self-fluxing properties and superior flow and wetting action on various base metals, allowing for the deposition of these welding alloys without the utilization of external fluxing agents. In addition, these zinc free modified alloys have sufficiently low melting points to permit molten pool deposition on brass, bronze and copper without melting of the base metal. Further this resultant alloy is ductile and machinable and not brittle as would normally be expected from an alloy system containing boron and silicon. When combined in the above described proportions, this novel welding alloy comprises the following range of constituents in the following weight percents:

WEIGHT PERCENTS

| Constituents | Broad | Preferred |
|---|---|---|
| Silicon | 0 to .4% | .05 to .15%. |
| Boron | .02 to .5% | .05 to .10%. |
| Phosphorus | 0.1 to 1% | .2 to .6%. |
| Tin | 4 to 25% | 6 to 19%. |
| Copper | Balance essentially | Balance essentially. |

The above described silicon-boron-phosphorus-tin-copper alloy can be utilized in a homogenous cast rod having the above described alloy constituents.

The above described silicon-boron-phosphorus-tin-copper alloy can be further utilized in homogenous alloy powder having the above described alloy constituents, for simultaneous spraying and molten pool generation on various base metals such as, for example, brass, bronze, copper, cast iron, steel, etc. by use of any heat source such as an oxyacetylene type welding torch such as that recited in United States Patent No. 2,786,779, issued to A. Long et al. The homogeneous alloy powders can be formed by any number of well known processes such as by melting an alloy containing the required constituents and forming a powder by atomization of the hot melt.

The above described silicon-boron-phosphorus-tin-copper alloy can be deposited as a homogenous alloy weld deposit having the above described alloy constitutents by combining various hetereogeneous powder forms which can be produced by mechanically mixing various alloy systems to produce the desired mixture for simultaneous spraying and molten pool generation on various base metals such as, for example, brass, bronze, copper, cast iron, steel, etc., by use of any heat source such as an oxyacetylene type welding torch such as that recited in U.S. Patent No. 2,786,779, issued to A. Long et al. on Mar. 26, 1957. By way of example for illustration purposes only, a typical alloy system mixture could be produced by mechanically mixing powder forms of the following alloy systems in the weight percentages indicated in the following two examples:

EXAMPLE 1

Up to 25% of a copper base alloy containing 1.6% silicon.
Up to 17% of a copper base alloy containing 7.5% phosphorus.
1 to 25% of a copper base alloy containing up to 2% boron.
Up to 21% of tin.
Balance essentially a copper base alloy containing up to 4% tin.

EXAMPLE 2

Up to 14% of a copper base alloy containing 3% silicon.
1 to 17% of a copper base alloy containing 7.5% phosphorus.
22 to 69% of a copper base alloy containing 18% tin.

Up to 1 to 25% of a copper base alloy containing up to 2% boron.
Up to 21% tin.
Up to 26% copper.

The above described silicon-boron-phosphorus-tin-copper alloy can further be deposited as a homogenous weld deposit having the above described alloy constituents by metal tubes with proper heterogeneous alloy combination fills. By way of example for illustration purposes, some typical metal tube and alloy fill combinations are as follows:

EXAMPLE 3

A copper tube filled with 46% by weight of a —30 mesh alloy powder mixture consisting of the following alloy systems in the weight percentages indicated:

10 parts of a copper base alloy containing 3% silicon.
10 parts of a copper base alloy containing 2% boron.
10 parts of a copper base alloy containing 7.5% phosphorus.
16 parts tin.

EXAMPLE 4

A copper base alloy tube such as one having 3% tin filled with 46% by weight of a —30 mesh alloy powder mixture consisting of the following alloy systems in the weight percentages indicated:

20 parts of a copper base alloy containing 18% tin.
10 parts of a copper base alloy containing 2% boron.
10 parts of a copper base alloy containing 7.5% phosphorus.
6 parts of a copper base alloy containing 3% silicon.

The above described silicon-boron-phosphorus-tin-copper alloy can still further be deposited as a homogeneous weld deposit having the above described alloy constituents in the form of a coated electrode for electric arc deposition. The core wire can be of a metal such as, for example, a pure copper or a tin bronze alloy. It will be understood by those skilled in the art that the metal core can be flux coated with an alloy containing compatible flux or coating formulation, the deposited weld metal will be the homogenous alloy hereinbefore described. By way of example for illustration purposes, some typical coated electrodes are as follows:

EXAMPLE 5

A pure copper core wire such as for example that grade known industrially as deoxidized copper with the following coating formulation in the indicated weight percentages:

WEIGHT PERCENT

| Constituents | Broad | Narrow |
|---|---|---|
| Carbonaceous material | 10 to 30% | 13 to 20%. |
| Alkaline earth metal salts | 25 to 60% | 50 to 60%. |
| Ferro boron powder | .01 to 30% | 2 to 10%. |
| Tin powder | 4 to 25% | 6 to 19%. |
| Phosphorus powder | .1 to 1% | .2 to .6%. |

EXAMPLE 6

A copper alloy core such as a tin bronze alloy as for example that identified as Phosphor bronzes and identified as Grades A, C, and D on p. 961 of the "Metals Handbook," vol. 1, 8th ed., published in 1961 by the American Society of Metals containing 5, 8 and 10 percent tin by weight respectively and also containing approximately 0.25 percent by weight of phosphorus with the following coating formulation in the indicated weight percentages:

WEIGHT PERCENT

| Constituents | Broad | Narrow |
|---|---|---|
| Carbonaceous material | 10 to 30% | 13 to 20%. |
| Alkaline earth metal salts | 25 to 60% | 50 to 60%. |
| Ferro boron powder | .01 to 30% | 2 to 10%. |
| Tin powder | 0 to 15% | 1 to 9%. |
| Phosphorus powder | 0 to .75% | 0 to .35%. |

It has been further found that the above outlined boron and silicon modified copper base alloys when modified further by alloying with nickel in amounts of 1 to 10% by weight. The resultant alloys not only contained the advantages hereinbefore described for the boron and silicon modified copper base alloys but in addition have greatly improved ductility and impact resistance. In addition, these resultant alloys have better controlled fluidity characteristics than those ordinarily expected in copper-tin alloys. These controlled fluidity properties result in the prevention of the separation and isolation of the weld molten pool during accidental superheating of the weld pool which is especially important in the welding process of metal spraying with simultaneous molten pool generation.

It has been further discovered that the nickel modified copper base alloys have improved wetting characteristics for wetting the surface of refractory carbides. Thus, these nickel-boron-silicon modified copper-tin-phosphorus alloys are surprisingly effective when used as a matrix for supporting and retaining refractory carbides, as for example in a cast rod with entrapped carbide particles for subsequent welding deposition or in a metal spray deposit with entrapped carbides or as a fabricated tubular welding consumable with mesh carbide fill and alloy constituents which will result upon melting in a welding operation in the deposition of a heterogeneous hard particle containing overlay deposit, having a matrix of the chemical properties of our invention with the carbide particles entrapped therein upon a parent metal to provide wear resistant cutting surfaces.

Illustrative uses for such overlays include tools for drilling, boring, reaming and coring bucket teeth and all types of well drilling and mining equipment. When used as a matrix, the present alloy is soft enough to preferentially wear thereby leaving the hard and sharp edges of the carbide particles protruding in effective cutting positions.

Refractory carbides which may be used include carbides of numerous refractory metals including titanium, zirconium, vanadium, chromium, molybdenum, tungsten, tantalum and columbium. These refractory carbides can be used individually or in combination.

Those skilled in the art are aware of the size and type of carbides required for particular utility as for example particle sizes ranging from 1/8" to 3/16" and angular in shape are normally used when good cutting and drilling characteristics are required and mesh sizes below 20 mesh provide good wear and abrasion resistance.

The percentage ratios of refractory carbide particles to matrix alloy according to the invention depend on the specific requirements of the various uses. As little as 10 percent carbide particles by weight has been found to be effective for certain uses. As little as 5 percent matrix alloy by weight has been found to have utility. Generally, a weight proportion of between 60 and 75 percent carbide particles to 25 to 40 percent matrix alloy is particularly preferred. An example of an effective composite rod utilizes 65% by weight of cast tungsten carbide particles with 35% by weight of the present matrix alloy.

When combined in the above proportions the welding alloy comprises the following range of constituents in the following weight percents:

WEIGHT PERCENTS

| Constituents | Broad | Preferred |
|---|---|---|
| Nickel | 1 to 10% | 1 to 4%. |
| Silicon | 0 to .4% | .05 to .15%. |
| Boron | .02 to .5% | .05 to .10%. |
| Phosphorus | .1 to 5% | .2 to 2%. |
| Tin | 4 to 25% | 6 to 19%. |
| Copper | Balance essentially | Balance essentially. |

The above described nickel-silicon-boron-phosphorus-tin-copper alloy can be utilized in a homogenous cast rod having the above described alloy constituents. In addition, the cast rod can be utilized as a carbide containing matrix as herein amply described with a weight proportion broadly ranging from 10 to 95 percent by weight carbide particles and a range of 5 to 90 percent by weight matrix alloy with a preferred range of 60 to 75 percent by weight carbide particles and 25 to 40 percent by weight of matrix alloy.

The above nickel-silicon-boron-phosphorus-tin-copper alloy can be further utilized in homogenous alloy powder having the above described alloy constituents, for simultaneous spraying and molten pool generation on various base metals such as for example brass, bronze, copper, cast iron, steel, etc. by use of any heat source such as an oxy-acetylene type welding torch such as that recited in United States Patent No. 2,786,778, issued to A. Long et al. on Mar. 26, 1957. The homogenous alloy powders can be formed by any number of well known processes such as by melting an alloy containing the required constituents and forming a powder by atomization of the hot melt. In addition, carbide particles can be mixed with the homogenous powder, to deposit a hard particle containing overlay in weight proportions broadly ranging from 10 to 95 percent by weight carbide particles mechanically mixed with a range of 5 to 90 percent of the homogenous powder with a preferred range of 60 to 75 percent by weight carbide particles and 25 to 40 percent by weight of homogenous alloy powder.

The above described nickel-silicon-boron-phosphorus-tin-copper alloy can be deposited as a homogenous alloy weld deposit having the above described alloy constituents by combining various heterogeneous powders which can be produced by mechanically mixing various alloy systems to produce the desired mixtures for simultaneous spraying and molten pool generation on various base metals such as, for example, brass, bronze, copper, cast iron, steel, etc. by use of any heat source such as an oxy-acetylene type welding torch such as that recited in U.S. Patent No. 2,786,779, issued to A. Long et al. on Mar. 26, 1957. By way of example for illustration purposes only, a typical alloy system mixture could be produced by mechanically mixing powders of the following alloy systems in the weight percentages indicated in the following two examples:

EXAMPLE 7

Up to 10% of a copper base alloy containing 1.6% silicon.
3.3 to 33% of a copper base alloy containing 3% phosphorus.
Up to 10% of a nickel base alloy containing 3% silicon and 2% boron.
Up to 21% tin.
Balance essentially a copper base alloy containing 4% tin.

EXAMPLE 8

Up to 25% of a copper base alloy containing 1.6% silicon.
1 to 17% of a copper base alloy containing 7.5% phosphorus.
1 to 10% nickel-boron alloy containing up to 5% boron.
4 to 25% tin.
Balance essentially copper.

In addition carbide particles can be mixed with the above described heterogeneous powders to deposit a hard particle containing overlay consisting of a matrix of the present constituents in weight proportions broadly ranging from 10 to 95 percent by weight carbide particles mechanically mixed with a range of 5 to 90 percent of the heterogeneous powders, with a preferred range of 60 to 75 percent by weight carbide particles and 25 to 40 percent by weight of heterogeneous powders.

The above described nickel-silicon-boron-phosphorus-tin-copper alloy can further be deposited as a homogenous weld deposit having the above described alloy constituents by metal tubes with proper heterogeneous alloy combination fills. By way of example for illustrative purposes, some typical metal tube and alloy fill combinations are as follows:

EXAMPLE 9

A copper tube filled with 46% by weight of a −30 mesh alloy powder mixture consisting of the following alloy systems in the weight percentages indicated:

15 parts tin.
10 parts of a nickel base alloy containing 3% boron, 3% silicon.
10 parts of a copper base alloy containing 7.5% phosphorus.
11 parts copper.

EXAMPLE 10

A copper base alloy tube such as one having 80% copper and 20% nickel filled with 46% by weight of a −30 mesh alloy powder mixture consisting of the following alloy systems in the weight percentages indicated:

25 parts of a copper base alloy containing 18% tin.
11 parts of a copper base alloy containing 7.5% phosphorus.
5 parts of a copper base alloy containing 2% boron.
5 parts of a copper base alloy containing 3% silicon.

In addition carbide particles can be mixed in a metal tube with the tube fill to deposit a hard particle containing overlay with the matrix consisting of the present composition constituents, by metal tubes with proper carbide and heterogeneous alloy combination fills. By way of example for illustration purposes some typical metal tube and fill combinations are as follows:

EXAMPLE 11

A copper tube filled with 60% by weight of a −30 mesh fill consisting of carbide particles and alloy powder mixture of the following alloy systems in the weight percentages indicated:

15 parts carbide.
10 parts of a nickel base alloy containing 3.5% boron, and 3.5% silicon.
10 parts of a copper base alloy containing 7.5% phosphorus.
15 parts tin.
10 parts of a copper base alloy containing 18% tin.

EXAMPLE 12

A copper base alloy tube such as one having 3% tin filled with 60% by weight of a −30 mesh fill consisting of carbide particles and alloy powder mixture of the following alloy systems in the weight percentages indicated:

15 parts carbide.
10 parts of a nickel base alloy containing 3.5% boron and 3.5% silicon.
10 parts of a copper base alloy containing 7.5% phosphorus.
5 parts tin.
26 parts of a copper base alloy containing 18% tin.

The above described nickel-silicon-boron-phosphorus-tin-copper alloy can still further be deposited as a homogenous weld deposit having the above described alloy constituents in the form of a coated electrode for electric arc deposition. The core wire can be of a metal such as for example a pure copper or a tin bronze alloy. It will be understood by those skilled in the art that the metal core can be flux coaetd with an alloy containing compatible flux or coating formulation, the deposited weld metal will be the homogenous alloy hereinbefore described. By way of example for illustration purposes, some typical coated electrodes are as follows:

EXAMPLE 13

A pure copper core wire such as, for example, that grade known industrially as deoxidized copper with the following formulation in the indicated weight percentages:

WEIGHT PERCENTS

| Constituents | Broad | Preferred |
| --- | --- | --- |
| Carbonaceous material | 10 to 30% | 13 to 20%. |
| Alkaline earth metal salts | 25 to 60% | 50 to 60%. |
| Nickel boron powder | .01 to 30% | 2.0 to 10%. |
| Nickel powder | 0 to 30% | 2.0 to 12.0%. |
| Tin powder | 4 to 25% | 6 to 10%. |

A copper alloy core such as a tin bronze alloy as, for example, that identified as Phosphor bronzes and identified as grades A, C and D on p. 961 of the "Metals Handbook," vol. 1, 8th ed., published in 1961 by the American Society of Metals containing 5, 8 and 10 percent tin by weight respectively and also containing approximately 0.25 percent by weight of phosphorus with the following coating formulation in the indicated weight percentages:

WEIGHT PERCENTAGES

| Constituents | Broad | Preferred |
| --- | --- | --- |
| Carbonaceous material | 10 to 30% | 13 to 20%. |
| Alkaline earth salts | 25 to 60% | 50 to 60%. |
| Nickel boron powder | .01 to 30% | 2.0 to 10.0%. |
| Tin powder | 0 to 15% | 1 to 9%. |
| Phosphorus powder | 0 to .75% | 0 to .35%. |

In addition refractory carbide particles can be incorporated in the coating formulations hereinbefore outlined to deposit a hard particle containing overlay with the matrix consisting of the present composition constituents.

The quantity and particle size of the hard carbide particles for particular applications are within the knowledge of those skilled in the art and are further taught by U.S. Patent No. 3,023,130, issued to R. D. Wasserman.

It has been still further discovered that the nickel-boron-silicon modified copper-tin-phosphorus alloys as still further modified by alloying additions of chromium up to 2 percent by weight and iron up to 1% by weight, the resultant alloy has improved corrosion and oxidation resistance while retaining the improved characteristics hereinbefore described under the boron and silicon and nickel modified copper base alloys. The reduced oxidation in the weld deposit prevents deterioration of the weld deposit in corrosive atmospheres. When combined in the above proportions, the resultant novel welding alloy comprises the following range of constituents in the following weight percents:

WEIGHT PERCENTS

| Constituents | Broad | Preferred |
| --- | --- | --- |
| Nickel | 1 to 10% | 1 to 4%. |
| Chromium | 0 to 2% | 0 to .6%. |
| Silicon | 0 to 4% | .05 to .15%. |
| Boron | .02 to .5% | .05 to .10%. |
| Phosphorus | .1 to 1% | .2 to .6%. |
| Tin | 4 to 25% | 6 to 19%. |
| Iron | .01 to 1% | .02 to .05%. |
| Copper | Balance essentially | Balance essentially. |

The above described nickel-chromium-silicon-boron-phosphorus-tin-iron-copper alloy can be utilized in a homogenous cast rod having the above described alloy constituents. In addition, the cast rod can be utilized as a carbide containing matrix as herein amply described with a weight proportion broadly ranging from 10 to 95 percent by weight carbide particles and a range of 5 to 90 percent by weight matrix alloy with a preferred range of 60 to 75 percent by weight carbide particles and 25 to 40 percent by weight of matrix alloy.

The above nickel-chromium-silicon-boron-phosphorus-tin-iron-copper alloy can be further utilized in homogenous alloy powder having the above described alloy constituents, for simultaneous spraying and molten pool generation on various base metals such as, for example, brass, bronze, copper, cast iron, steel, etc. by use of any heat source such as an oxy-acetylene type welding torch such as that recited in United States Patent No. 2,786,779, issued to A. Long et al. on Mar. 26, 1957. The homogenous alloy powders can be formed by any number of well known processes such as by melting an alloy containing the required constituents and forming a powder by atomization of the hot melt. In addition, carbide particles can be mixed with the homogenous powder, to deposit a hard particle containing overlay in weight proportions broadly ranging from 10 to 95 percent by weight carbide particles mechanically mixed with a range of 5 to 90 percent of the homogenous powder with a preferred range of 60 to 75 percent by weight carbide particles and 25 to 40 percent by weight of homogenous alloy powder.

The above described nickel-chromium-silicon-boron-phosphorus-tin-iron-copper alloy can be deposited as a homogenous alloy weld deposit having the above described alloy constituents by combining various heterogeneous powder forms which can be produced by mechanically mixing various alloy systems to produce the desired mixture for simultaneous spraying and molten pool generation on various base metals such as, for example, brass, bronze, copper, cast iron, steel, etc. by use of any heat source such as an oxy-acetylene type welding torch such as that recited in U.S. Patent No. 2,786,779, isued to A. Long et al. on Mar. 26, 1957. By way of example for illustration purposes only, a typical alloy system mixture could be produced by mechanically mixing powder forms of the following alloy systems in the weight percentages indicated in the following two examples:

EXAMPLE 14

Up to 10% fo a nickel base alloy containing 3.5% boron, 4.5% silicon, 18% chromium, 5% iron.
Up to 10% nickel.
1 to 17% of a copper base alloy containing 7.5% phosphorus.
20 to 50% of a copper base alloy containing 18% tin.
Up to 15% tin.

EXAMPLE 15

Up to 10% of a nickel base alloy containing 3.5% boron, 4.5% silicon, 18% chromium and 5% iron.
Up to 33% of a copper base alloy containing 30% nickel.
1 to 17% of a copper base alloy containing 7.5% phosphorus.
4 to 25% tin.
The balance essentially copper.

In addition carbide particles can be mixed with the above described heterogeneous powders to deposit a hard particle containing overlay consisting of a matrix of the present constituents in weight proportions broadly ranging from 10 to 95 percent by weight carbide particles mechanically mixed with a range of 5 to 90 percent of the heterogenous powders, with a preferred range of 60 to 75 percent by weight carbide particles and 25 to 40 percent by weight of heterogeneous powders.

The above described nickel-chromium-silicon-boron-phosphorus-tin-iron-copper alloy can further be deposited as a homogenous weld deposit having the above described alloy constituents by metal tubes with proper heterogeneous alloy combination fills. By way of example for illustration purposes, some typical metal tube and alloy fill combinations are as follows:

EXAMPLE 16

A copper tube filled with 46% by weight of a −30 mesh alloy pwoder mixture consisting of the following alloy systems in the weight percentages indicated:

6 parts tin.
20 parts of a copper base alloy containing 18% tin.
10 parts of a copper base alloy containing 7.5% phosphorus.
10 parts of a nickel base alloy containing 3.5% boron, 3.5% silicon, 15% chromium and 5% iron.

EXAMPLE 17

A copper base alloy tube such as one having 3% tin filled with 46% by weight of a —30 mesh alloy powder mixture consisting of the following alloy systems in the weight percentages indicated:

11 parts tin.
15 parts of a copper base alloy containing 18% tin.
10 parts of a copper base alloy containing 7.5% phosphorus.
10 parts of a nickel base alloy containing 3.5% boron, 3.5% silicon, 15% chromium and 5% iron.

In addition carbide particles can be mixed in a metal tube with the tube fill to deposit a hard particle containing overlay with the matrix consisting of the present composition constituents, by metal tubes with proper carbide and heterogeneous alloy combination fills. By way of example for illustration purposes, some typical metal tube and fill combinations are as follows:

EXAMPLE 18

A copper tube filled with 60% by weight of a —30 mesh fill consisting of carbide particles and alloy powder mixture of the following alloy systems in the indicated weight percentages:

25 parts carbide.
10 parts of a nickel base alloy containing 3.5% boron, 4.5% silicon, 15% chromium and 15% iron.
10 parts of a copper base alloy containing 7.5% phosphorus.
10 parts tin.
5 parts of a copper base alloy containing 18% tin.

EXAMPLE 19

A copper base alloy tube such as one having 1.5% silicon filled with 60% by weight of a —30 mesh fill consisting of carbide particles and alloy powder mixture of the following alloy systems in the weight percentages indicated:

25 parts carbide.
15 parts tin.
10 parts of a nickel base alloy containing 3.5% boron, 4.5% silicon, 15% chromium and 15% iron.
10 parts of a copper base alloy containing 7.5% phosphorus.

The above described nickel-chromium-silicon-boron-phosphorus-tin-iron-copper alloy can still further be deposited as a homogenous weld deposit having the above described alloy constituents in the form of a coated electrode for electric arc deposition. The core wire can be of a metal such as for example a pure copper or a tin bronze alloy. It will be understood by those skilled in the art that the metal core can be flux coated with an alloy containing compatible flux or coating formulation, the deposited weld metal will be the homogenous alloy hereinbefore described. By way of example for illustration purposes, some typical coated electrodes are as follows:

EXAMPLE 20

A pure copper core wire such as for example that grade known industrially as deoxidized copper with the following formulation in the indicated weight percentages:

WEIGHT PERCENT

| Constituents | Broad | Preferred |
| --- | --- | --- |
| Calcium carbonate | 18 to 25% | 19 to 21%. |
| Calcium fluoride | 15 to 30% | 21 to 25%. |
| Lepidolite | 15 to 25% | 17 to 20%. |
| Talc | 5 to 10% | 5 to 6%. |
| Titanium dioxide | 10 to 20% | 14 to 16%. |
| Barium carbonate | 0.1 to 10% | 2 to 4%. |
| Graphite | 0.1 to 5% | 2 to 4%. |
| Copper titanium | 0.1 to 10% | 3 to 5%. |
| Iron oxide | 0.1 to 5% | 2 to 3%. |
| Zirconium silicate | 1 to 5% | 2 to 3%. |
| Silicon-aluminum-manganese alloy | 0.1 to 5% | 2 to 3%. |
| Ferro boron and/or nickel boron alloy | 2 to 15% | 2 to 10%. |
| Chromium powder | 0.1 to 12.0% | 0.2 to 5%. |
| Nickel powder | 0.2 to 30% | 2 to 15%. |
| Tin powder | 4 to 25% | 6 to 19%. |

EXAMPLE 21

A copper alloy core such as a tin bronze alloy as for example that identified as Phosphor bronzes and identified as grades A, C and D on p. 961 of the "Metals Handbook," vol. 1, 8th ed., published in 1961 by the American Society of Metals containing 5, 8 and 10 percent tin by weight respectively and also containing approximately 0.25 percent by weight of phosphorus with the following coating formulation in the indicated weight percentages:

WEIGHT PERCENT

| Constituents | Broad | Preferred |
| --- | --- | --- |
| Calcium carbonate | 18 to 25% | 19 to 21%. |
| Calcium fluoride | 15 to 30% | 21 to 25%. |
| Lepidolite | 15 to 25% | 17 to 20%. |
| Talc | 5 to 10% | 5 to 6%. |
| Titanium dioxide | 10 to 20% | 14 to 16%. |
| Barium carbonate | 0.1 to 10% | 2 to 4%. |
| Graphite | 0.1 to 5% | 2 to 4%. |
| Copper titanium | 0.1 to 10% | 3 to 5%. |
| Iron oxide | 0.1 to 5% | 2 to 3%. |
| Zirconium silicate | 1 to 5% | 2 to 3%. |
| Silicon-aluminum-manganese alloy | 0.1 to 5% | 2 to 3%. |
| Ferro boron and/or nickel boron alloy | 2 to 15% | 2 to 10%. |
| Chromium powder | 0.1 to 12.0% | 0.2 to 5%. |
| Nickel powder | 0.2 to 30% | 2 to 15%. |
| Tin powder | 0 to 15% | 1 to 9%. |

In addition refractory carbide particles can be incorporated in the coating formulations hereinbefore outlined to deposit a hard particle containing overlay with the matrix consisting of the present composition constituents.

The quantity and particle size of the hard carbide particles for particular applications are within the knowledge of those skilled in the art and are further taught by U.S. Patent No. 3,023,130, issued to R. D. Wasserman.

Deposits of the herein described welding alloys (silicon, boron, phosphorus, tin and copper; nickel, silicon, boron, phosphorus, tin and copper; and nickel, chromium, silicon, boron, phosphorus, tin, iron, and copper) in the specified constituents are crack and porosity free and are highly ductile and machinable extending their utility to a variety of welding uses such as for example overlaying.

The low melting temperature and the absence of zinc allows these alloys to be utilized with a wide range of base metals in substantially all types of welding processes without the emission of poisonous fumes. All of these novel alloys described herein possess unexpected self-fluxing properties allowing their deposition without external fluxing agents. The exact reasons for the self-fluxing properties are not pin-pointed but it is believed that they can be partly attributed to the silicon and boron additions.

Homogenous or mechanical mixture powders of the alloy for simultaneous spraying and molten pool generation may be advantageously utilized in particle sizes ranging from below —150 mesh. The alloys of the present invention in powder form attain wide melting ranges with solidus temperatures lower than the melting temperature of 60–40 brass base metal. The low solidus temperatures allows simultaneous spraying and molten pool generation of the alloy powders on brass, bronze and copper base metals without fusion of the base metal. The wide melting ranges additionally causes the alloy weld pool to maintain sluggishness during welding.

We claim:

1. A copper base alloy consisting essentially of the following constituents in the following range of percentages by weight:

| | Percent |
|---|---|
| Silicon | trace to .4 |
| Boron | .02–.5 |
| Phosphorus | .1–1 |
| Tin | 4–25 |
| Copper | Balance essentially |

2. A copper base alloy consisting essentially of the following constituents in the following range percentages by weight:

| | Percent |
|---|---|
| Silicon | .05–.15 |
| Boron | .05–.10 |
| Phosphorous | .2–.6 |
| Tin | 6–19 |
| Copper | Balance essentially |

3. A copper base alloy consisting essentially of the following constituents in the following range percentages by weight:

| | Percent |
|---|---|
| Nickel | 1–10 |
| Silicon | Trace to .4 |
| Boron | .02–.5 |
| Phosphorus | .1–1 |
| Tin | 4–25 |
| Copper | Balance essentially |

4. The copper base alloy of claim 3 wherein the alloy is in powder form.

5. The powder of claim 4 containing 10 to 95 percent by weight carbide particles added therein.

6. A copper base alloy consisting essentially of the following constituents in the following range percentages by weight:

| | Percent |
|---|---|
| Nickel | 1–4 |
| Silicon | .05–.15 |
| Boron | .05–.10 |
| Phosphorus | .2–.6 |
| Tin | 6–19 |
| Copper | Balance essentially |

7. The copper base alloy of claim 6 wherein the alloy is in powder form.

8. The powder of claim 7 containing 10 to 95 percent by weight carbide particles added therein.

9. A copper base alloy consisting essentially of the following constituents in the following range percentages by weight:

| | Percent |
|---|---|
| Nickel | 1–10 |
| Chormium | 0–2 |
| Silicon | Trace to 4 |
| Boron | .02–.5 |
| Phosphorus | .1–1.2 |
| Tin | 4–25 |
| Iron | .01–1 |
| Copper | Balance essentially |

10. The alloy of claim 9 containing 10 to 95 percent by weight carbide particles added therein.

11. A copper base alloy consisting essentially of the following constituents in the following range percentages by weight:

| | Percent |
|---|---|
| Nickel | 1–4 |
| Chromium | 0–.6 |
| Silicon | .05–.15 |
| Boron | .05–.1 |
| Phosphorus | .2–.6 |
| Tin | 6–19 |
| Iron | .02–.1 |
| Copper | Balance |

12. The alloy of claim 11 containing 10 to 95 percent by weight carbides added.

References Cited

UNITED STATES PATENTS

| | | | |
|---|---|---|---|
| 2,009,977 | 7/1935 | Wilkins | 75—154 |
| 2,105,945 | 1/1938 | Hull | 75—154 |
| 2,129,197 | 9/1938 | Bryant | 75—154 |
| 2,190,267 | 2/1940 | Light | 75—154 |
| 2,636,101 | 4/1953 | De Pue | 75—154 |
| 2,755,182 | 7/1956 | Cape | 75—159 |
| 2,768,893 | 10/1956 | Bredzs | 75—159 |
| 2,891,860 | 6/1959 | Woolard | 75—159 |
| 3,293,029 | 12/1966 | Broderick et al. | 75—154 |

CHARLES N. LOVELL, *Primary Examiner.*

HYLAND BIZOT, RICHARD O. DEAN, *Examiners.*